United States Patent
Li et al.

(10) Patent No.: US 10,712,230 B2
(45) Date of Patent: Jul. 14, 2020

(54) STRETCHABLE SENSOR LAYER

(71) Applicant: Acellent Technologies, Inc., Sunnyvale, CA (US)

(72) Inventors: Frank J. Li, Sunnyvale, CA (US); Fu-Kuo Chang, Stanford, CA (US); Irene J. Li, Stanford, CA (US)

(73) Assignee: Acellent Technologies, Inc., Sunnyvale, CA (US)

( * ) Notice: Subject to any disclaimer, the term of this patent is extended or adjusted under 35 U.S.C. 154(b) by 101 days.

(21) Appl. No.: 15/629,553

(22) Filed: Jun. 21, 2017

(65) Prior Publication Data

US 2018/0058975 A1 Mar. 1, 2018

Related U.S. Application Data

(60) Provisional application No. 62/352,969, filed on Jun. 21, 2016.

(51) Int. Cl.
*G01M 5/00* (2006.01)

(52) U.S. Cl.
CPC ........ *G01M 5/0066* (2013.01); *G01M 5/0041* (2013.01)

(58) Field of Classification Search
CPC .................. G01M 5/0066; G01M 5/0041
USPC .......................................................... 73/577
See application file for complete search history.

(56) References Cited

U.S. PATENT DOCUMENTS

| | | | |
|---|---|---|---|
| 6,264,237 B1 * | 7/2001 | Terada | B60R 21/237 280/743.1 |
| 7,387,033 B2 * | 6/2008 | Qing | G01D 5/35383 73/587 |
| 8,013,600 B1 * | 9/2011 | Yepez, III | G01N 27/9033 324/240 |
| 2004/0200613 A1 * | 10/2004 | Fripp | E21B 47/0006 166/250.01 |
| 2006/0283266 A1 * | 12/2006 | Qing | G01D 5/35383 73/862.041 |
| 2009/0134318 A1 * | 5/2009 | Kuniyoshi | G01L 1/205 250/231.19 |
| 2009/0157358 A1 * | 6/2009 | Kim | G01L 1/16 702/185 |
| 2009/0217761 A1 * | 9/2009 | Qing | G01N 29/045 73/587 |

(Continued)

FOREIGN PATENT DOCUMENTS

WO   WO-2014066802 A1 *   5/2014   ............... G01B 7/16

*Primary Examiner* — Natalie Huls
*Assistant Examiner* — Monica S Young
(74) *Attorney, Agent, or Firm* — Haley Guiliano LLP

(57) ABSTRACT

A structural health monitoring system comprises: a flexible substrate configured for attachment to a structure, the flexible substrate having a plurality of sensors affixed thereon. The flexible substrate comprises a first portion configured for attachment to the structure, a second portion extending in continuous manner from the first portion, and a third portion extending in continuous manner from the second portion and being configured for attachment to the structure. The second portion includes a first section extending in continuous manner from the first portion, a second section connected between the first section and the third portion and having an edge extending in a direction different from an edge of the first section.

9 Claims, 10 Drawing Sheets

(56) References Cited

U.S. PATENT DOCUMENTS

| | | | |
|---|---|---|---|
| 2015/0097801 A1* | 4/2015 | Trend | G06F 3/046 345/174 |
| 2015/0276372 A1* | 10/2015 | Tata | G01B 7/16 623/6.38 |
| 2017/0357344 A1* | 12/2017 | Hong | G06F 3/0414 |

* cited by examiner

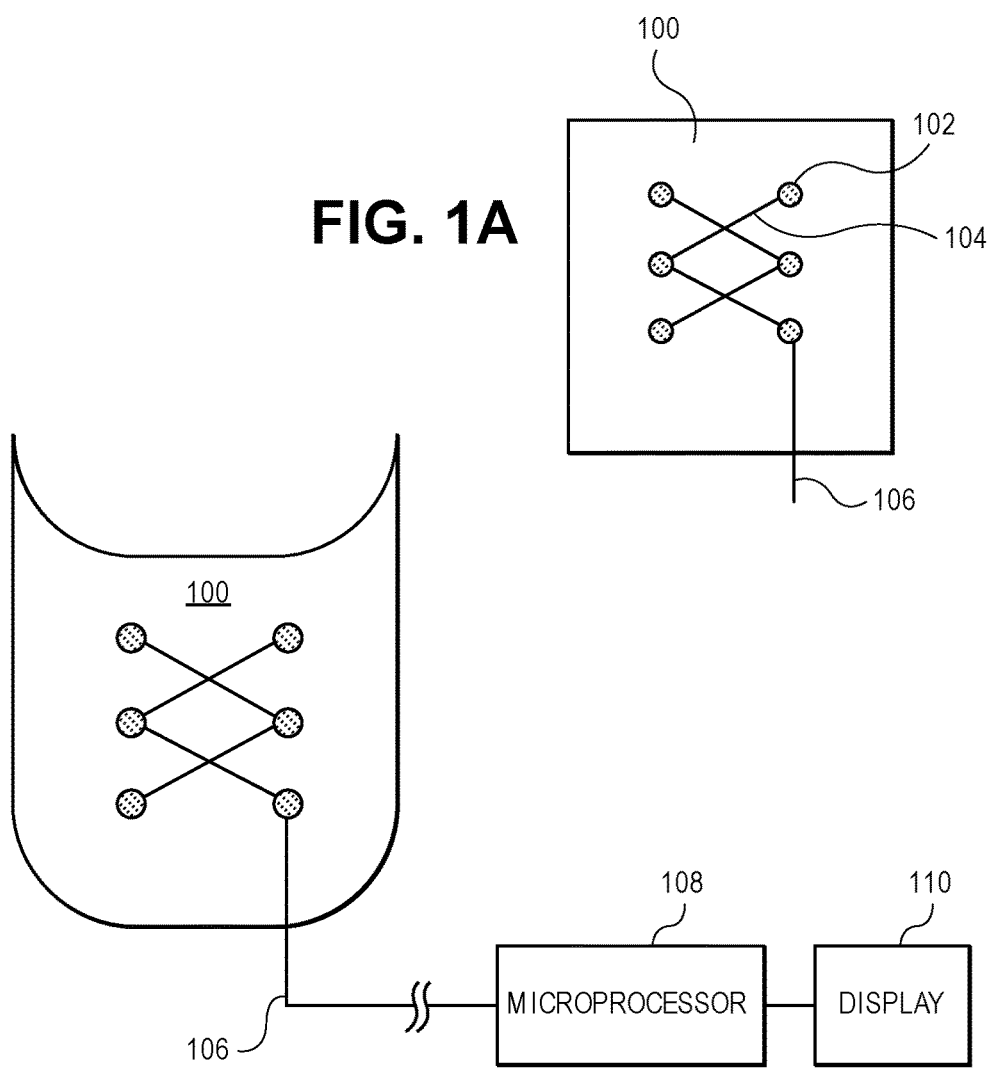
FIG. 1A
FIG. 1B
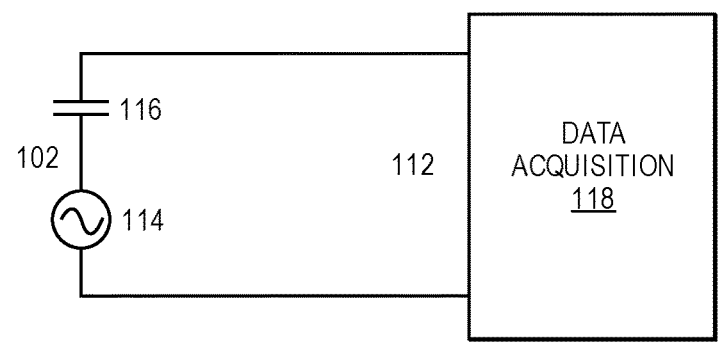
FIG. 1C

STRETCHABLE SENSOR LAYER

PRIORITY

This application claims priority to, and the benefit of, U.S. Provisional Patent Application No. 62/352,969 filed on Jun. 21, 2016, the entire content of which is hereby incorporated by reference.

GOVERNMENT INTEREST

This invention was made with Government support under contract number NNX16CC63P awarded by the National Aeronautics and Space Administration (NASA). The Government has certain rights in the invention.

BRIEF DESCRIPTION

Embodiments of the invention relate generally to structural health monitoring. More specifically, embodiments of the invention relate to two-dimensional structural health monitoring systems conformable to three dimensional structures.

BACKGROUND

The diagnostics and monitoring of structures, such as that carried out in the structural health monitoring field, are often accomplished by employing arrays of sensing elements coupled to a structure. These sensing elements then either passively monitor the structure for the presence of stress waves propagating therein, or actively interrogate the structure by generating such stress waves, where the stress waves have predetermined waveforms and amplitudes.

For many structures, it is desirable to employ a large number of sensors. Examples include large structures, and structures with many areas of high stress. Each sensor typically requires multiple wires or leads, so that simply dealing with the accurate placement of sensors, and placing their wires, becomes time consuming and cumbersome. Accordingly, some applications employ a flexible layer upon which both sensors and their wires are mounted. In this manner, only a single layer need be applied to the structure, rather than multiple individual sensing elements and their wires.

Such layers have their drawbacks, however. For instance, even though they may be flexible, it is sometimes difficult to conform such layers to highly curved or irregular structures without excessively folding or tearing them, as folds and tears risk damage to the sensing elements and their wires. Accordingly, efforts have been made to improve the conformability of such layers.

SUMMARY

The invention can be implemented in a number of ways, including as an apparatus.

In one embodiment, a structural health monitoring system comprises a flexible substrate configured for attachment to a structure, the flexible substrate having a plurality of sensors affixed thereon. The flexible substrate comprises a first portion configured for attachment to the structure, a second portion extending in continuous manner from the first portion, and a third portion extending in continuous manner from the second portion and being configured for attachment to the structure. The second portion includes a first section extending in continuous manner from the first portion, a second section connected between the first section and the third portion and having an edge extending in a direction different from an edge of the first section.

The first and second portions may be substantially linear portions.

The first and second portions may be collectively arranged in a chevron shape in plan view.

The structural health monitoring system may further comprise a plurality of the first portions, a plurality of the second portions, and a plurality of the third portions, each second portion connected between a respective one of the first portions and a respective one of the third portions.

An intersection of the first section and the second section may have a width smaller than a width of both the first portion and the second portion.

The sensors may be affixed on the first and second portions but may be absent from the third portion.

The first and second portions may have collinear upper edges, and opposing lower edges oriented at an angle with respect to the upper edges.

The opposing lower edges may be substantially V-shaped edges.

The opposing lower edges may be substantially U-shaped edges.

Other aspects and advantages of embodiments of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which:

FIG. 1A illustrates a top view of an exemplary sensing layer;

FIGS. 1B-1C illustrate block and circuit diagrams, respectively, describing elements of a sensing layer and their operation;

DETAILED DESCRIPTION OF EMBODIMENTS OF THE INVENTION

Figure 2A:
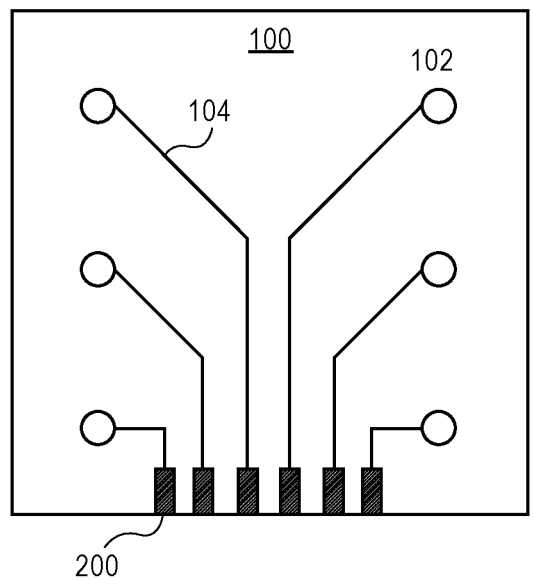
FIG. 2A illustrates a top view highlighting further details of a sensing layer having a two-dimensional array of sensors.

In one embodiment, the invention relates to two dimensional layers of sensing elements that are conformable to three dimensional or curved surfaces. Fabricating three dimensionally curved substrates or flexible layers is often prohibitively difficult and expensive. Accordingly, embodiments of the invention provide for two dimensional or flat/planar layers which can be applied to three dimensional or curved surfaces with minimal folding, thus allowing for cheaper and easier to manufacture substrates that also prevent damage to their sensors and wires when they conform to a structure.

As described above, a sensor network can be placed on a flexible dielectric substrate to form a diagnostic layer. FIG. 1A illustrates such a flexible diagnostic layer for use in accordance with embodiments of the present invention. A diagnostic layer 100 is shown, which contains an array of transducers 102. As above, the transducers 102 can act as sensors capable of receiving signals used in structural health monitoring such as stress waves, and also as actuators capable of generating vibration, and are connected to conductive traces 104. The traces 104 connect (or interconnect, if necessary) transducers 102 to one or more output leads 106 configured for connection to a processor or other device capable of analyzing the data derived from the sensors 102. Accordingly, the transducers 102 can both passively generate electrical signals in response to stress waves, and actively transmit stress waves when a voltage is applied to them.

The diagnostic layer 100 and its operation are further described in U.S. Pat. No. 6,370,964 to Chang et al., which is hereby incorporated by reference in its entirety and for all purposes. Construction of the diagnostic layer 100 is also explained in U.S. Pat. No. 7,413,919, filed on Jun. 21, 2004, which is also incorporated by reference in its entirety and for all purposes. It should be noted that the present invention is not limited to the embodiments disclosed in the aforementioned U.S. Pat. No. 7,413,919. Rather, any network of sensors and actuators can be employed, and any flexible substrate may be used. The invention simply contemplates sensors and actuators that are attached to any flexible substrate in any manner. Accordingly, the diagnostic layers illustrated herein are used for purposes of convenience only, and other layers can be employed as well.

FIG. 1B further describes aspects of the operation of the diagnostic layer 100. In operation, the output leads 106 are electrically connected to an analysis unit such as a microprocessor 108, suitable for analyzing signals from the sensors 102. In certain embodiments, the flexible layer 100 is first attached to a structure in a manner that allows the sensing elements 102 to detect quantities related to the health of the structure. For instance, the sensors 102 can be sensors configured to detect stress waves propagated within the structure, and emit electrical signals accordingly. The microprocessor 108 then analyzes these electrical signals to assess whether damage has occurred. Quantities such as these can then be displayed to the user via display 110.

In one embodiment, the sensors 102 can be piezoelectric transducers capable of reacting to a propagating stress wave by generating a voltage signal. Analysis of these signals highlights properties of the stress wave, such as its magnitude, propagation speed, frequency components, and the like. Such properties are known to be useful in structural health monitoring. FIG. 1C illustrates a circuit diagram representation of such an embodiment. This embodiment can often be represented as a circuit 112, where each sensor 102 is represented as a voltage source 114 in series with a capacitor 116 (impedance circuitry) used to adjust signal strength. This pair is in electrical contact with a data acquisition unit 118, such as a known data acquisition card employed by microprocessors 108 (the data acquisition unit 118 can be thought of as a component interface to the microprocessor 108). Propagating stress waves induce the sensor 102 to emit a voltage signal that is recorded by the data acquisition unit 118, where it can be analyzed to determine the health of the structure in question. As discussed below, these piezoelectric transducers can also act as actuators, converting an applied voltage to a stress wave signal. In another embodiment, the sensors 102 can be known fiber optic sensors that convert stress waves to optical signals.

Figure 2B:
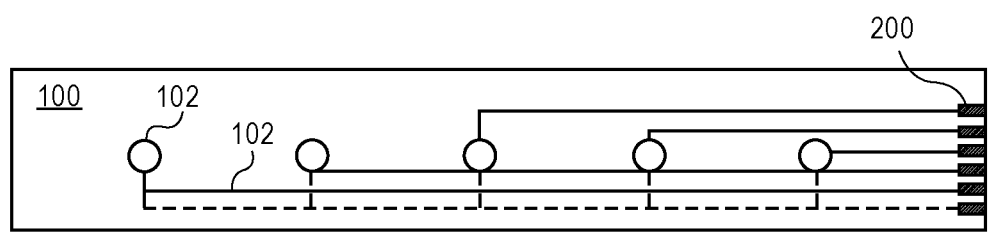
FIG. 2B illustrates a top view highlighting further details of a sensing layer having a one-dimensional array of sensors.

FIG. 2A illustrates further details of a sensing layer 100. It should be noted that the invention includes sensing layers 100 configured in any number of ways. For instance, the sensors 102 can be distributed in any manner throughout the layer 100. Here, six such sensors 102 are shown regularly distributed in a two-dimensional array, each with a single trace 104 extending to the contacts 200. However, one of skill will observe that the sensors 102, traces 104, and contacts 200 can be distributed in any manner, and in any number, without departing from the scope of the invention. For example, the sensors 102 can also be configured in a one-dimensional array such as that shown in FIG. 2B. Here, instead of two rows of sensors 102, a single row is employed. Such a one-dimensional array finds uses in, for example, the monitoring of areas too narrow to fit a two-dimensional array.

Figure 3:
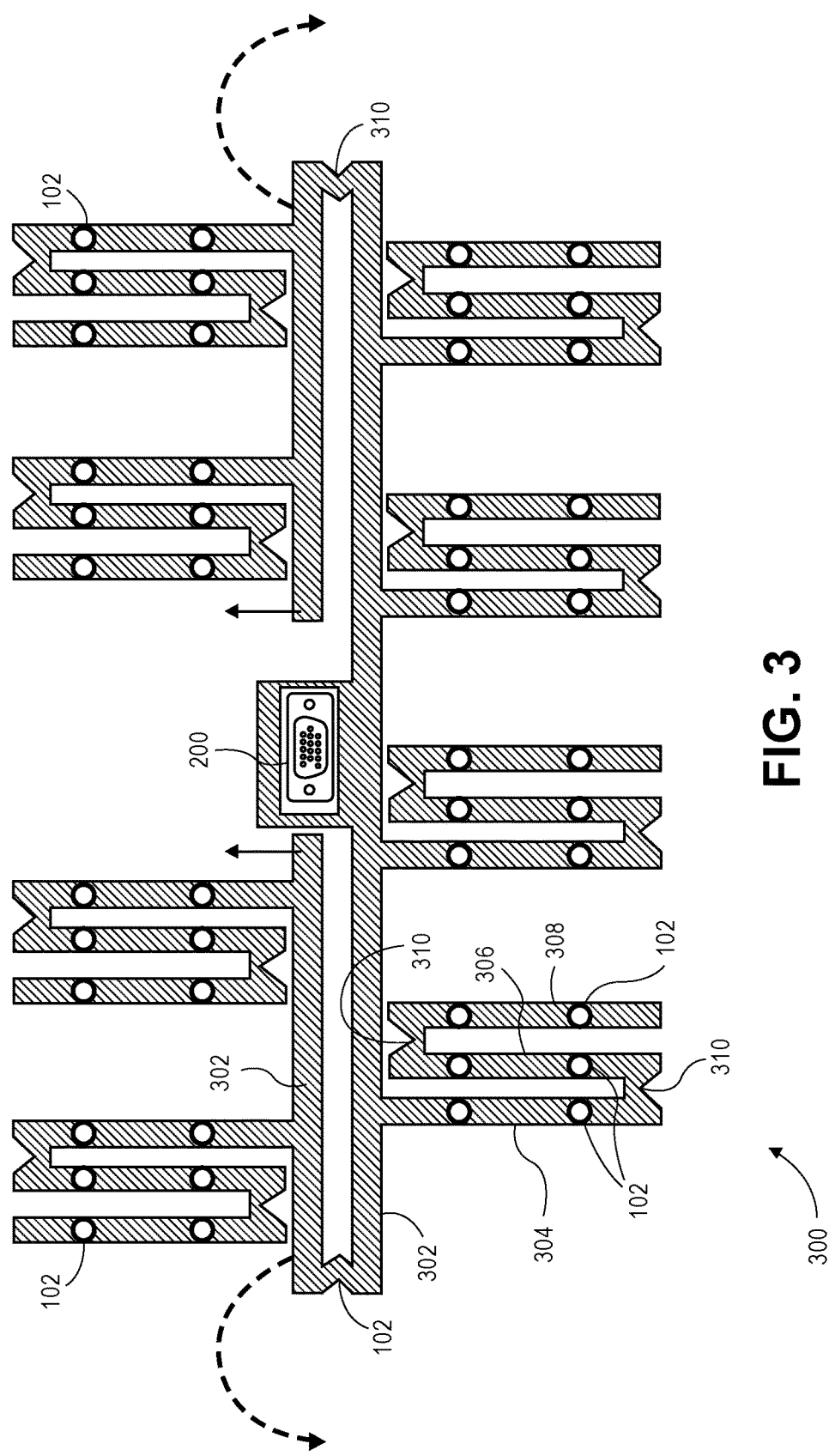
FIG. 3 illustrates a top or plan view of a sensing layer shaped and arranged according to embodiments of the invention.

FIG. 3 illustrates a top or plan view of a sensing layer shaped and arranged according to embodiments of the invention. Here, a sensing layer 300, which can be a specially shaped and arranged version of sensing layer 100 of FIGS. 1 and 2, is shaped as a substantially flat or planar sheet cut into a number of linear sections 302, 304, 306, 308. Any number and arrangement of such linear sections 302, 304, 306, 308 is contemplated. Each of the sections 302, 304, 306, 308 may contain any number of sensors 102, or may contain none at all. For example, in FIG. 1, section 302 contains no sensors 102, while each of sections 304, 306 and 308 contains two sensors 102. In FIG. 3, traces 104 are not shown for clarity and ease of explanation, but traces 104 extend from each sensor 102 to contacts 200 along the various sections 302, 304, 306, 308 as would be understood by one of ordinary skill in the art.

Some adjacent linear sections 302, 304, 306, 308 may be joined by intersection portions 310, which are simply continuous extensions of the layer 300. That is, the layer 300 extends in continuous manner from one linear section 302, 304, 306, 308 to the adjacent linear section 302, 304, 306, 308, and the portion of layer 300 between these adjacent linear sections 302, 304, 306, 308 is an intersection portion having a designated shape in plan view. In particular, the intersection portions 310 are shaped so as to allow for stretching of their two adjacent linear sections outward. For example, in FIG. 3, the leftmost intersection portion 310 serves effectively as a pivot point, allowing the far end of its upper adjacent linear section 302 to be pulled in the direction of the upward facing arrow. That is, the upper adjacent linear section 302 is pulled so that it rotates about its intersection portion 310, in the direction of the leftmost dotted arrow. In this manner, various linear sections 302, 304, 306, 308 may be pulled apart from each other and rotated about their respective intersection portions 310, so as to be able to conform to an irregular shape of the structure to which layer 300 is attached. In other words, each intersection portion 310 acts as a flexible pivot point, allowing its adjacent linear sections 302, 304, 306, 308 to be pulled apart from one another, and thus to be moved so as to more easily conform to the surface of the structure.

In this embodiment, sensors 102 are absent from intersection portions 310, although this need not necessarily be the case. Various embodiments contemplate sensors 102 positioned on any one or more of sections 302, 304, 306, 308, and 310.

The intersection portion 310 may have any shape which allows its adjacent sections 302, 304, 306, 308 to be pulled apart without excessive warping, folding or tearing. As one nonlimiting example, the intersection portion 310 may be shaped as shown by the leftmost portion 310 of FIG. 3, with two intersecting linear sections extending from each section 302 at an angle, forming a sideways chevron or peaklike shape. As another nonlimiting example, the bottommost intersection portion 310 of FIG. 3 may be shaped with a straight or linear upper edge, and a lower edge that is curvilinear or comprises two angled edges as shown. That is, the lower edge may form an inverted V shape, or any other shape such as a dome shape or inverted U shape. The upper edge may be straight as shown, or curved in any manner.

Figure 4A:
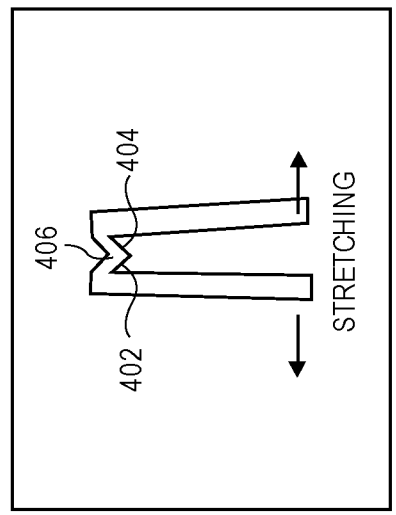
FIGS. 4A-4C illustrate stretching and folding operations for conforming a sensing layer of an embodiment of the invention to a structure.
Figure 4B:
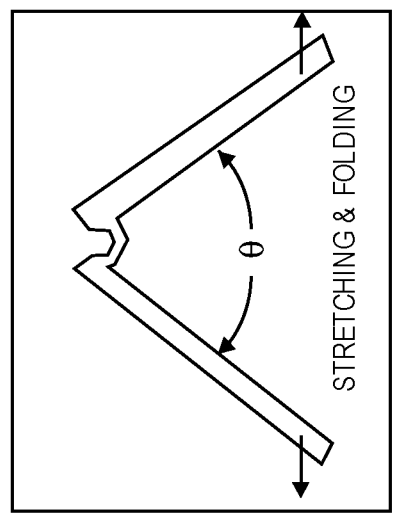
Figure 4C:
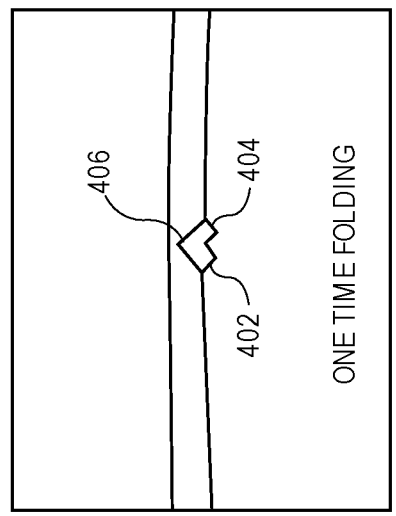

FIGS. 4A-4C illustrate stretching and folding operations for conforming a sensing layer of an embodiment of the invention to a structure. Here, stretching and folding operations are illustrated. FIG. 4A illustrates a portion of an exemplary layer prior to a stretching operation. More specifically, linear sections 402 and 404 may be pulled apart from each other so as to pivot about intersection portion 406, as shown in FIG. 4B. The linear sections 402, 404 may be pulled apart from each other as shown, so that an included angle θ is formed therebetween. As will be observed by one of ordinary skill in the art, as θ increases, i.e. as the linear sections 402, 404 are pulled apart, the intersection portion 406 warps or deforms. In this case, the intersection portion 406 warps or bends upward, with the point or end of intersection portion 406 pointing upward out of the plane of FIG. 4B. This warped intersection portion 406 may be simply attached or adhered to the structure if the degree of deformation is not excessive, or portion 406 may be folded back onto itself and over the sections 402, 404 as shown in FIG. 4C. In tests, it has been found that linear sections 402, 404 can be pulled apart from each other to form an included angle as great as θ=108°, without damage to sensors 102 or leads 104.

Additionally, when the intersection portion 406 warps as in FIG. 4B, this warped intersection portion 406 can be folded over and back onto the two linear sections 402, 404, as shown in FIG. 4C. In particular, the sections 402, 404 can be pulled apart as far as θ=180°, whereupon the resulting warped intersection portion 406 can be folded back onto sections 402, 404 and bonded thereto. In tests, it was found that one such fold retained sufficient signal integrity to allow for normal operation of sensors 102 in many applications. That is, some embodiments contemplate folding the intersection portion 406 one or fewer times.

In operation, sensor layer 300 may be fabricated in known manner, and shaped and/or cut to any shape. In particular, it should be noted that sensor layer 300 is formed as a flat or two-dimensional sheet, like that shown in FIG. 3. Such flat or planar sheets are much more readily and cheaply manufactured. The flat sensor layer 300 can then be stretched out and bent as described above, to accommodate a wide variety of curved or irregular surfaces. The sensor layer 300 is then affixed to the irregular surface of a structure, e.g. using known bonding techniques. In this manner, a sensor layer 300 can be manufactured as a flat sensor layer that is still usable on curved surfaces, allowing for sensor layers that are fabricated as cheaply as conventional two-dimensional layers yet are conformable to three dimensional or curved surfaces.

Figure 5:
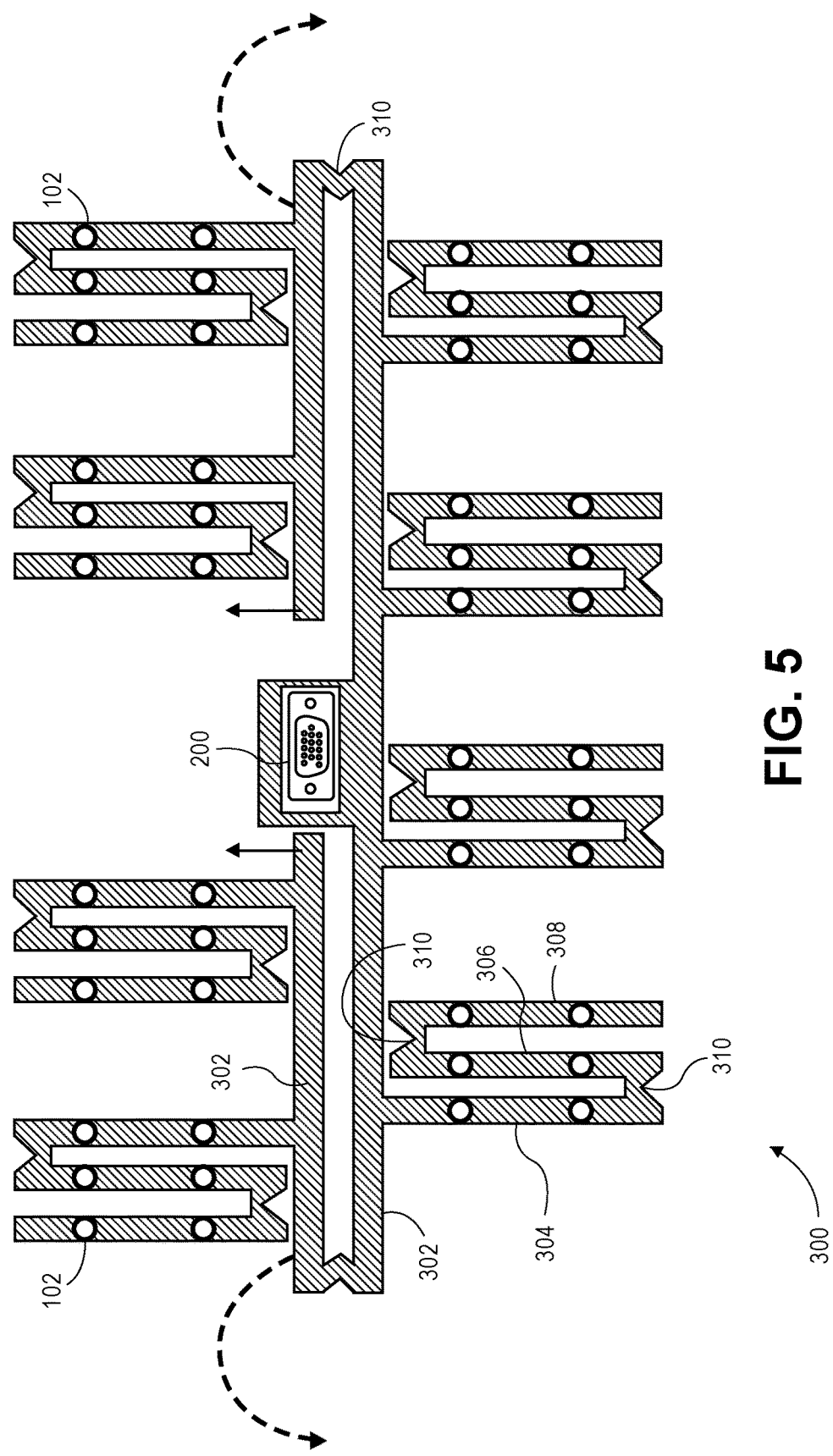
FIG. 5 illustrates a plan view of a sensing layer shaped and arranged according to another embodiment of the invention.

FIG. 5 illustrates a plan view of a sensing layer shaped and arranged according to another embodiment of the invention. The sensing layer 300 of FIG. 5 is similar to that of FIG. 3 in appearance, but the series of dots are added to illustrate that any shape and number of the sections 302, 304, 306, 308 and intersection portions 310.

Figure 6:
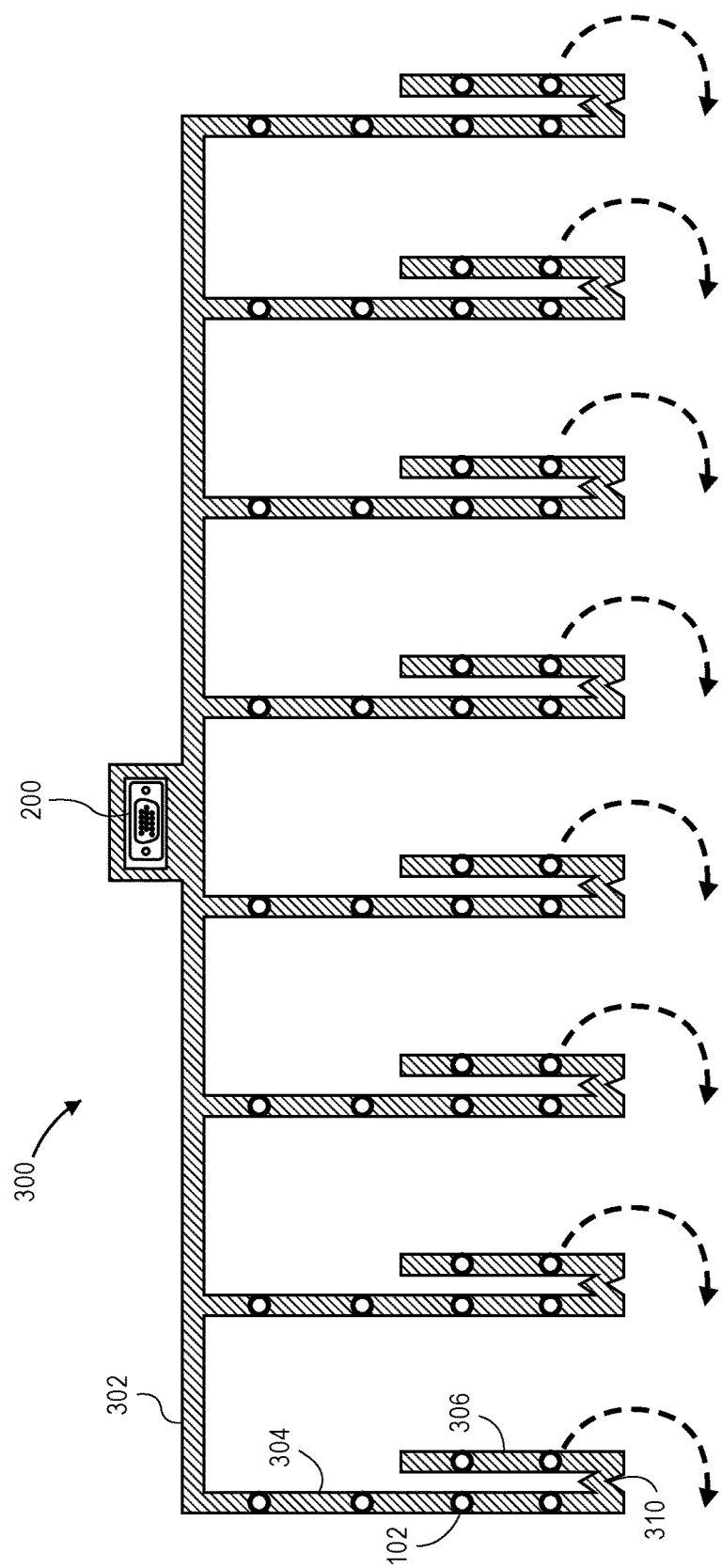
FIG. 6 illustrates a plan view of a sensing layer shaped and arranged according to yet another embodiment of the invention.

FIG. 6 illustrates a plan view of a sensing layer shaped and arranged according to yet another embodiment of the invention. Here, the sensing layer 300 is shaped with a number of linear sections 304 extending from section 302, and each linear section 304 has an intersection portion 310 connecting to another section 306. That is, each linear section 304 has only a single associated intersection portion 310 connecting to one section 306, without any sections 308. Additionally, each section 304 extends from the same side of section 302.

Figure 7:
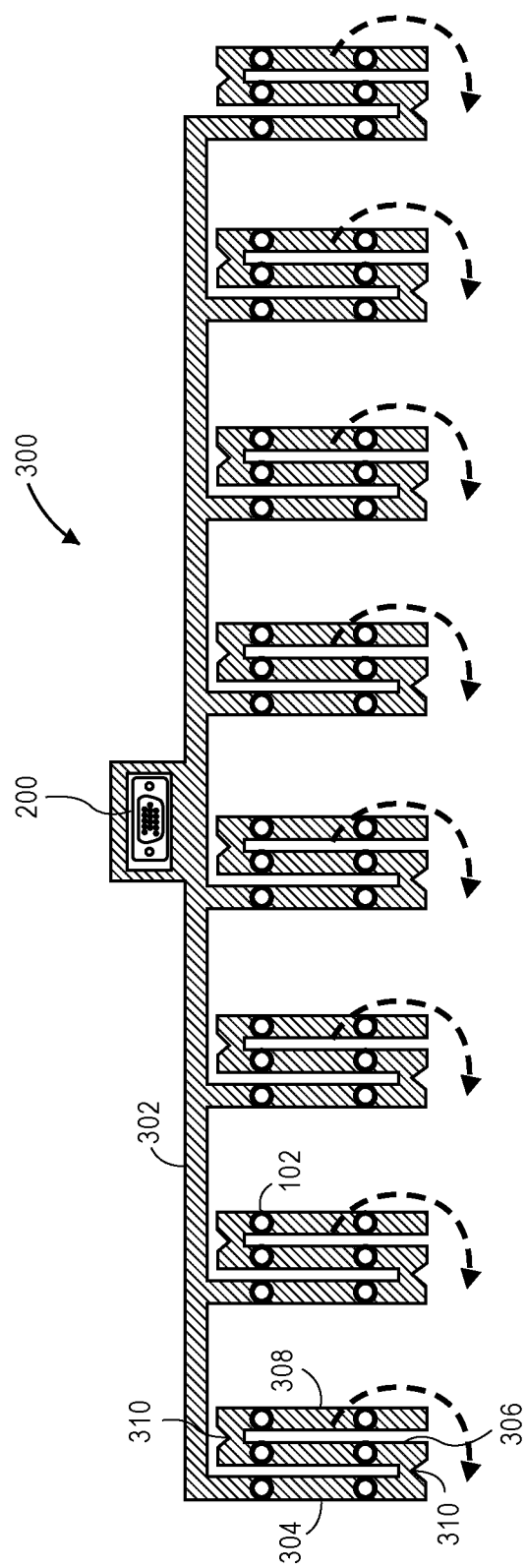
FIG. 7 illustrates a plan view of a sensing layer shaped and arranged according to still another embodiment of the invention.

FIG. 7 illustrates a plan view of a sensing layer shaped and arranged according to still another embodiment of the invention. Here, the sensing layer 300 has sections 302, 304, 306, 308 and intersection portions 310 arranged similar to those of FIG. 3, but with each section 304 extending from the same side of section 302, and with a greater number of sections 304, 306, 308 and portions 310.

Taken together, the embodiments of FIGS. 3 and 5-7 illustrate that embodiments of the invention contemplate any number and positioning of sections 302, 304, 306, 308 and their associated portions 310. Each of the sections 302, 304, 306, 308 and portions 310 may also be of any dimensions, so long as they remain useful for structural health monitoring.

Figure 8:
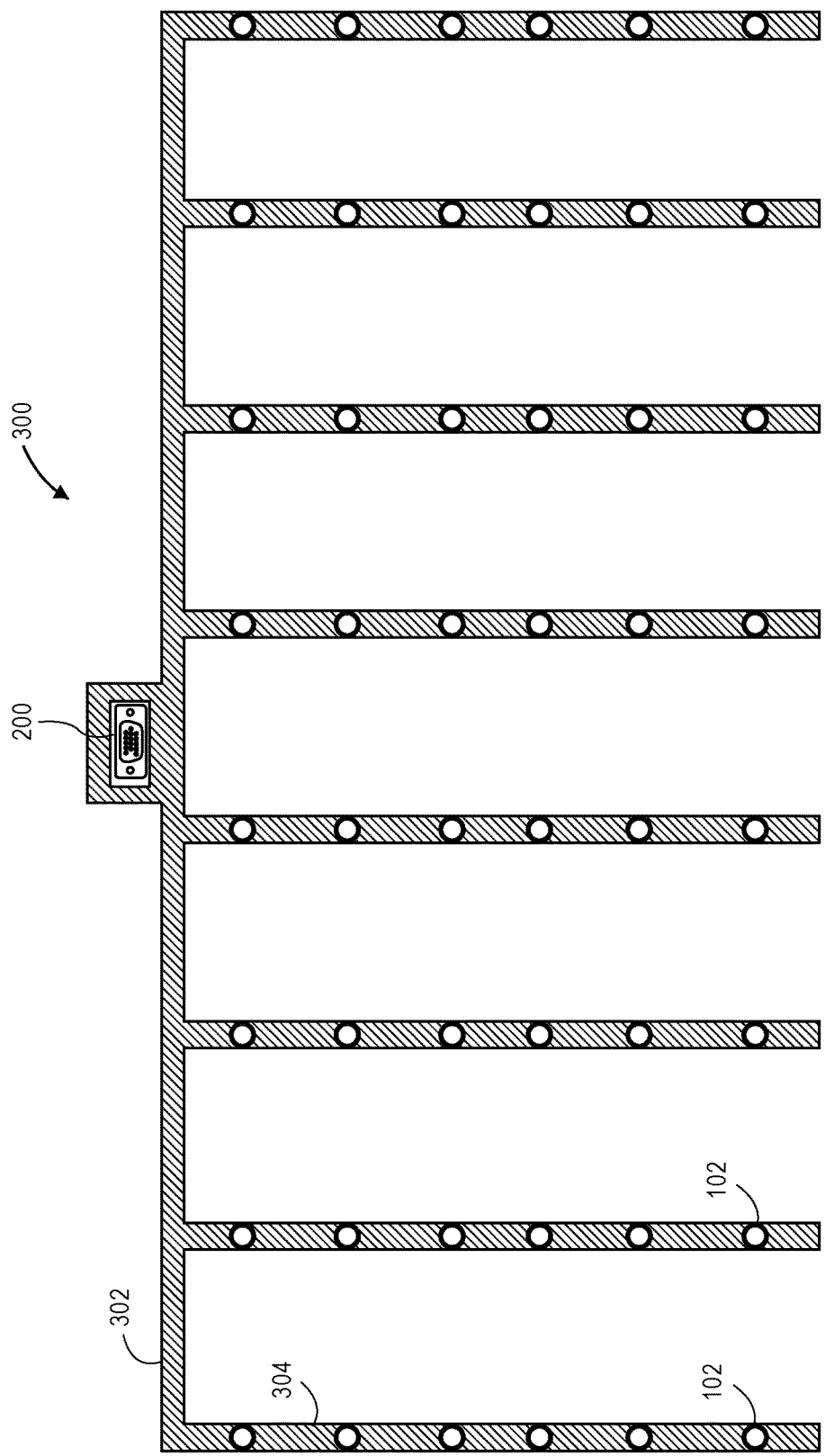
FIG. 8 illustrates a plan view of a sensing layer shaped and arranged according to a still further embodiment of the invention.

FIG. 8 illustrates a plan view of a sensing layer shaped and arranged according to a still further embodiment of the invention. Here, each section 304 has no associated intersection portion 310 or sections 306, 308 extending therefrom. That is, section 302 has a number of linear branches, or sections 304, extending therefrom.

Figure 9:
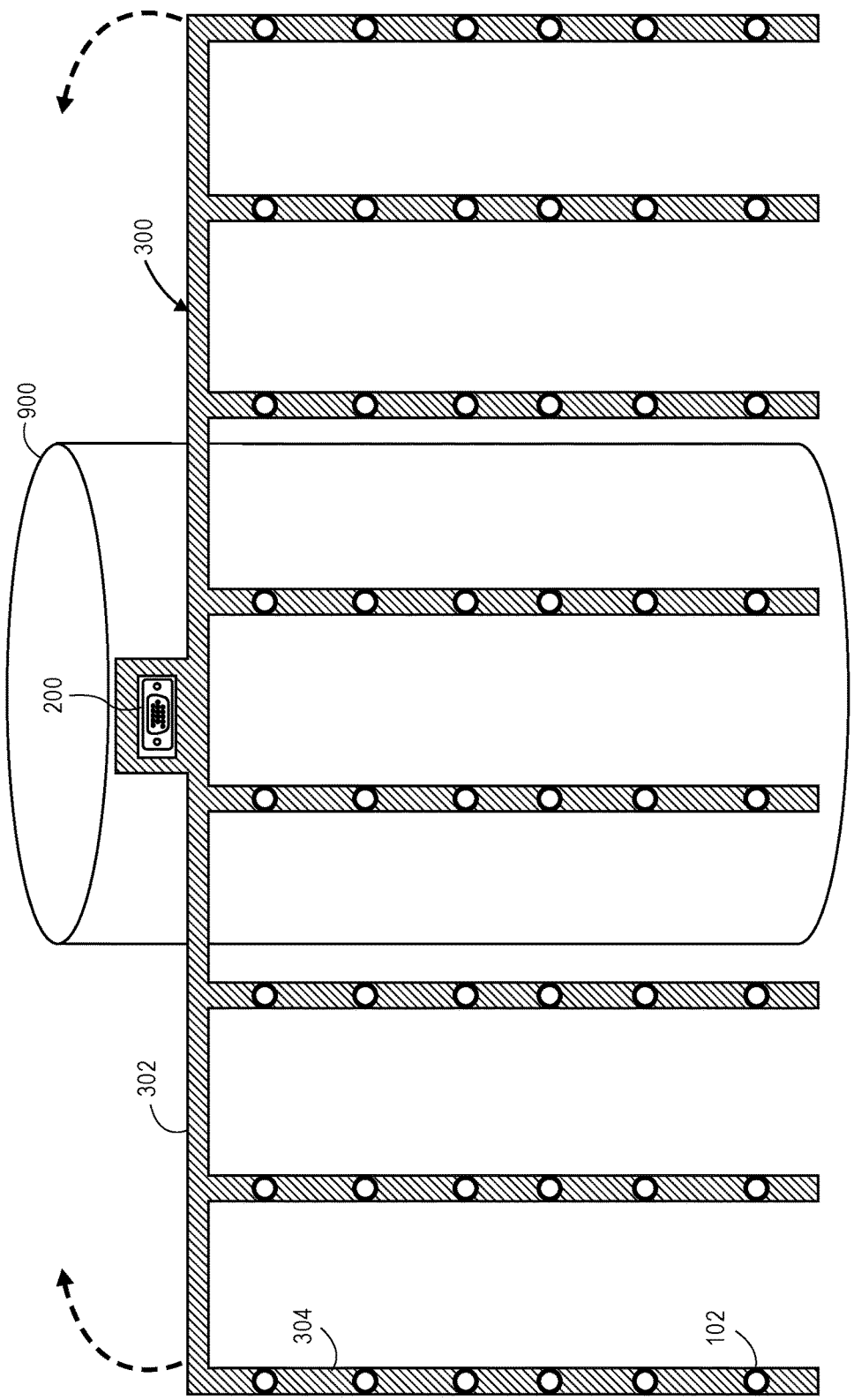
FIG. 9 and FIG. 10 illustrate application of the sensing layer of FIG. 8 to the three-dimensional surface of a structure.
Figure 10:
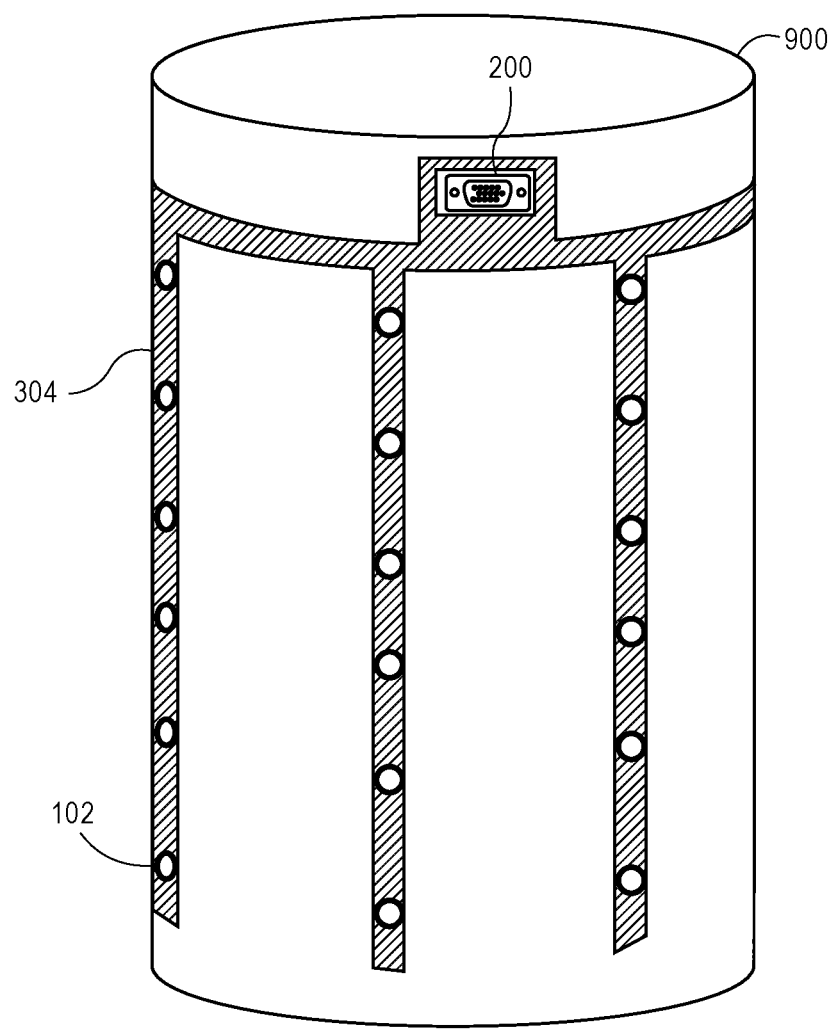

FIG. 9 and FIG. 10 illustrate application of the sensing layer of FIG. 8 to the three-dimensional surface of a structure. A two-dimensional sensing layer 300 is fabricated as in FIG. 8, and wrapped around the outer surface of an exemplary cylindrical structure 900. The sensing layer 300 is then bonded to the surface of structure 900. In this manner, a potentially large number of sensors 102 are fabricated on a two-dimensional layer, and then bonded to three-dimensional structure 900 where they can be used in monitoring the health of structure 900.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, sensor layers can contain any number of different sections connected by intersection portions of any shape that allows for flexible bonding to a three-dimensional surface. Additionally, these sections and intersection portions may be of any shapes and any dimensions. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A structural health monitoring system, comprising:
a continuous, flexible dielectric substrate having a plurality of sensors affixed thereon;
wherein the flexible substrate comprises a first portion configured for attachment to a structure, a second portion extending in continuous and flexible manner from a distal end of the first portion, and a third portion extending in continuous manner from the second portion and being configured for attachment to the structure; and
wherein the second portion includes a first section extending in continuous manner from the distal end of the first portion, and a second section connected between a distal end of the first section and the third portion and having a first edge extending in a first direction from the distal end of the first portion to the third portion and a second edge extending in a second direction from the distal end of the first portion to the third portion, the first direction being different from the second direction.

2. The structural health monitoring system of claim 1, wherein the first and second portions are substantially linear portions.

3. The structural health monitoring system of claim 2, wherein the first and second sections are arranged to form a chevron shape in plan view.

4. The structural health monitoring system of claim 1, further comprising a plurality of the first portions, a plurality of the second portions, and a plurality of the third portions, each second portion connected between a respective one of the first portions and a respective one of the third portions.

5. The structural health monitoring system of claim 1, wherein an intersection of the first section and the second section has a width smaller than a width of both the first portion and the second portion.

6. The structural health monitoring system of claim 1, wherein the sensors are affixed on the first and second portions but are absent from the third portion.

7. The structural health monitoring system of claim 1, wherein the first and second sections have collinear upper edges extending from the distal end of the first portion to the third portion, and opposing lower edges oriented at an angle with respect to the upper edges.

8. The structural health monitoring system of claim 7, wherein the opposing lower edges are substantially V-shaped edges.

9. The structural health monitoring system of claim 7, wherein the opposing lower edges are substantially U-shaped edges.

* * * * *